(12) United States Patent
Marasigan et al.

(10) Patent No.: US 10,919,364 B2
(45) Date of Patent: Feb. 16, 2021

(54) VEHICLE AIR CONDITIONING DEVICE

(71) Applicant: DENSO CORPORATION, Kariya (JP)

(72) Inventors: Ariel Marasigan, Kariya (JP); Koji Miura, Kariya (JP); Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 16/250,215

(22) Filed: Jan. 17, 2019

(65) Prior Publication Data

US 2019/0143793 A1 May 16, 2019

Related U.S. Application Data

(63) Continuation of application No. PCT/JP2017/021416, filed on Jun. 9, 2017.

(30) Foreign Application Priority Data

Jul. 22, 2016 (JP) .................................. 2016-144569
May 29, 2017 (JP) .................................. 2017-105743

(51) Int. Cl.
*B60H 1/32* (2006.01)
*B60H 1/00* (2006.01)

(52) U.S. Cl.
CPC .......... *B60H 1/3208* (2013.01); *B60H 1/005* (2013.01); *B60H 2001/3272* (2013.01); *B60H 2001/3273* (2013.01); *B60H 2001/3285* (2013.01)

(58) Field of Classification Search
CPC .... B60H 1/005; B60H 1/3208; B60H 1/3273; B60H 1/5285
See application file for complete search history.

(56) References Cited

U.S. PATENT DOCUMENTS 5,277,038 A    1/1994    Carr
6,330,909 B1 *   12/2001    Takahashi .............. B60H 1/005
                                                          165/202

(Continued)

FOREIGN PATENT DOCUMENTS

JP        S63014047 A      1/1988
JP        2003207219 A     7/2003

(Continued)

*Primary Examiner* — Marc E Norman
(74) *Attorney, Agent, or Firm* — Harness, Dickey & Pierce, P.L.C.

(57) ABSTRACT

The present disclosure provides a vehicle air-conditioning device in which cooperative work with a power source is appropriate, which is easy to follow when the power source is restarted, and which reduces a driving force of a compressor at the time of restarting the power source. The vehicle air-conditioning device is provided with a refrigeration cycle. The refrigeration cycle has a compressor that is driven by a power source which may stop temporarily. The refrigeration cycle provides a low temperature and/or a high temperature. A high-temperature system and/or a low-temperature system is provided as a thermal buffer. The refrigeration cycle is provided with electric expansion valves which can be fully closed. The vehicle air-conditioning device is also provided with a control device, which fully closes the electric expansion valves when the compressor is temporarily stopped and which controls the electric expansion valves to the previous opening position when the compressor is restarted.

4 Claims, 6 Drawing Sheets

(56) References Cited

U.S. PATENT DOCUMENTS

| | | |
|---|---|---|
| 6,701,731 B2 | 3/2004 | Aikawa et al. |
| 6,807,820 B2 | 10/2004 | Aikawa et al. |
| 2006/0137853 A1 | 6/2006 | Haller et al. |
| 2010/0198416 A1* | 8/2010 | Kasahara ................ F25B 49/02 700/282 |
| 2016/0047562 A1* | 2/2016 | Bartlett ................... F28F 1/003 62/115 |
| 2016/0290525 A1 | 10/2016 | Hotta et al. |
| 2019/0275855 A1* | 9/2019 | Ota ........................ B60H 1/323 |

FOREIGN PATENT DOCUMENTS

| | | |
|---|---|---|
| JP | 2006519133 A | 8/2006 |
| JP | 2012162125 A | 8/2012 |
| JP | 2015014306 A | 1/2015 |

* cited by examiner

VEHICLE AIR CONDITIONING DEVICE

CROSS REFERENCE TO RELATED APPLICATIONS

The present application is a continuation application of International Patent Application No. PCT/JP2017/021416 filed on Jun. 9, 2017, which designated the United States and claims the benefit of priority from Japanese Patent Applications No. 2016-144569 filed on Jul. 22, 2016, and No. 2017-105743 filed on May 29, 2017. The entire disclosures of all of the above applications are incorporated herein by reference.

TECHNICAL FIELD

The disclosure in this specification relates to a vehicle air conditioning device mounted on a vehicle and air-conditioning an interior of the vehicle interior.

BACKGROUND ART

U.S. Pat. Nos. 5,277,038 and 6,807,820 disclose a technique for storing cold or hot energy in a secondary system medium without directly using a source of cold energy or a source of hot energy. U.S. Pat. No. 6,701,731 discloses a technique for providing temperature adjustment ability during the stop period when the refrigeration cycle is temporarily stopped. JP2015-14306A discloses an electric expansion valve that can be completely closed.

SUMMARY

Further improvements are required for vehicle air conditioning device in view of a disclosed or other aspects not mentioned.

In the vehicle air conditioning device disclosed herein, comprising: a refrigeration cycle having a compressor which power supply from a power source is temporarily stopped and providing high temperature energy and/or low temperature energy; a system provided as a thermal buffer between the high temperature energy and/or the low temperature energy provided by the refrigeration cycle; an electric expansion valve provided in the refrigeration cycle and capable of fully closing a fully closed state; and a fully-closing drive module which drives the electric expansion valve to the fully closed state when the compressor is temporarily stopped.

According to the disclosed vehicle air conditioning device, the system provides a thermal buffer. Therefore, even if the compressor is stopped and the compressor and the refrigeration cycle lose the temperature adjustment function, the temperature control ability is maintained depending on the system. Moreover, the electric expansion valve is completely closed. Therefore, the pressure difference between the high pressure and the low pressure is maintained. Therefore, even if the compressor is stopped and the compressor and the refrigeration cycle lose the temperature control function, the temperature adjustment is continued by the system, and the maintained pressure difference between the high pressure and the low pressure makes it easy to restart the refrigeration cycle at restarting. Further, since the pressure difference is maintained at the time of many restarts, it is not necessary to re-apply the pressure difference, so the driving force of the compressor can be reduced.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

DETAILED DESCRIPTION

Figure 1:
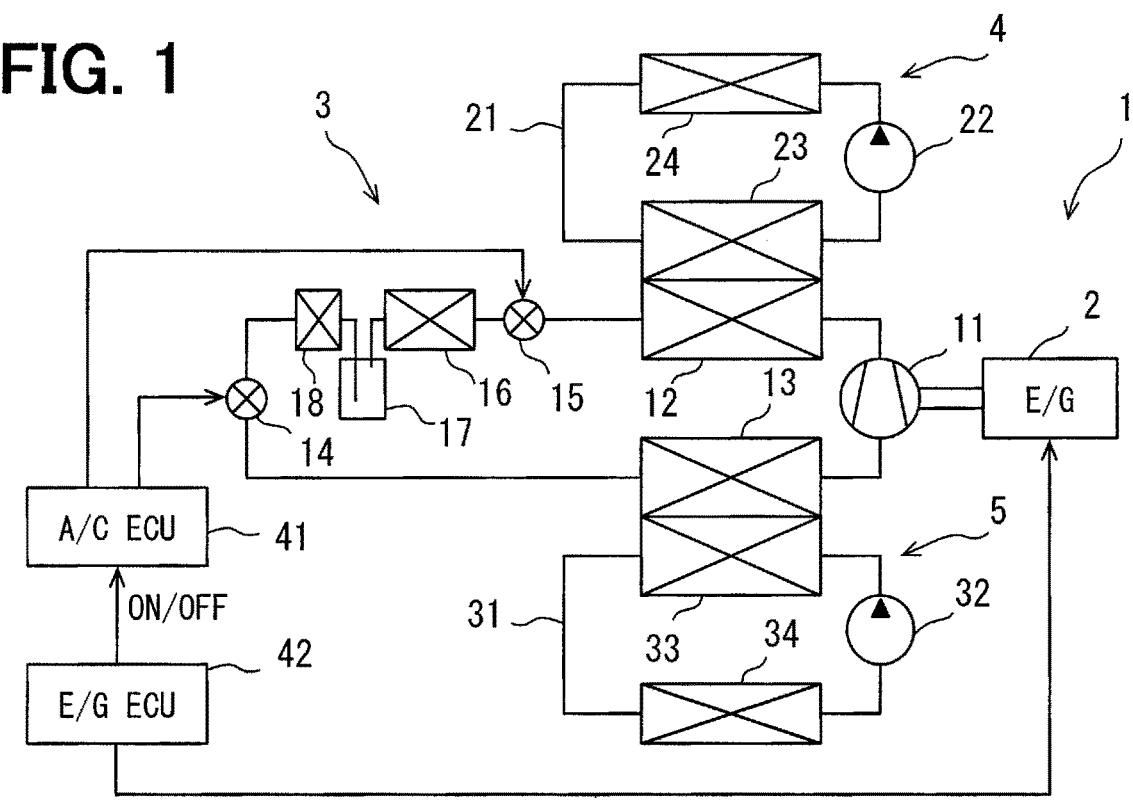
FIG. 1 is a block diagram of a vehicle air conditioning device according to a first embodiment.

Hereinafter, a plurality of embodiments will be described with reference to the drawings. In some embodiments, parts that are functionally and/or structurally corresponding and/or associated are given the same reference numerals, or reference numerals with different hundred digit or more digits. For corresponding parts and/or associated parts, reference can be made to the description of other embodiments.

It is an object disclosed to provide a vehicle air conditioning device in which cooperative work with a power source is appropriate.

It is another object disclosed to provide a vehicle air conditioning device which is easy to follow when the power source is restarted.

It is still another object disclosed to provide a vehicle air conditioning device which reduces a driving force of a compressor at the time of restarting the power source.

First Embodiment

In FIG. 1, a configuration of a vehicle air conditioning device 1 is shown. The vehicle air conditioning device 1 is mounted on a vehicle. The vehicle is a road running vehicle. The vehicle has an engine (E/G) 2 for running. The engine 2 is also used as a power source of the vehicle air conditioning device 1. The engine 2 may be temporarily stopped.

The vehicle air conditioning device 1 has a refrigeration cycle 3. The refrigeration cycle 3 is used as a low temperature and/or high temperature heat source device of the vehicle air conditioning device 1. The refrigeration cycle 3 has a compressor 11 driven by the engine 2. The compressor 11 can provide a one-way mechanism. The refrigeration cycle 3 is a vapor compression type refrigeration cycle. The refrigeration cycle 3 has a high-temperature heat exchanger 12 provided on a discharge side of the compressor 11. The refrigeration cycle 3 has a low-temperature heat exchanger 13 provided on an intake side of the compressor 11. The high-temperature heat exchanger 12 and the low-temperature heat exchanger 13 provide heat exchangers of the refrigeration cycle 3. The high-temperature heat exchanger 12 provides a heat exchanger utilizing a high temperature obtained by the refrigeration cycle 3. The low temperature heat exchanger 13 provides a heat exchanger utilizing a low temperature obtained by the refrigeration cycle 3.

The refrigeration cycle 3 has electric expansion valves 14 and 15. The electric expansion valves 14 and 15 are provided between the high-pressure system and the low-pressure system. The electric expansion valves 14 and 15 are used as orifices. The electric expansion valves 14 and 15 are provided at a boundary between the high-pressure system and the low-pressure system of the refrigeration cycle 3, and are members for maintaining a pressure difference therebetween. The electric expansion valves 14 and 15 can be brought into a completely closed state in which they are completely closed.

The refrigeration cycle 3 may include one of the electric expansion valve 14 and the electric expansion valve 15. An opening degree of the electric expansion valve 14 is controlled so as to control the refrigerant temperature in the low temperature heat exchanger 13, that is, the superheat degree (superheat) of the refrigerant at the outlet of the low temperature heat exchanger 13 to the target degree of superheat. When the electric expansion valve 14 is used as an orifice, the temperature of the low temperature heat exchanger 13 is adjusted. An opening degree of the electric expansion valve 15 is controlled so as to control the refrigerant temperature in the high temperature heat exchanger 12, that is, the superheat degree (superheat) of the refrigerant at the outlet of the high temperature heat exchanger 12 to the target degree of superheat. When the electric expansion valve 15 is used as an orifice, the temperature of the low temperature heat exchanger 12 is adjusted.

When the electric expansion valve 14 is provided, the section from the compressor 11 to the electric expansion valve 14 is a high pressure system. In the case where the electric expansion valve 14 is provided, the section from the electric expansion valve 14 to the compressor 11 is a low pressure system. The refrigeration cycle 3 includes a radiator 16, a receiver 17, and a sub-cooler 18. The high-temperature heat exchanger 12, the radiator 16, the receiver 17, and the sub-cooler 18, respectively, provide high-pressure equipment when the electrical expansion valve 14 is used as the orifice. The radiator 16 is used for dissipating heat which is not radiated by the high-temperature heat exchanger 12. The receiver 17 stores high-pressure refrigerant. The sub-cooler 18 gives supercooling to the refrigerant.

The vehicle air conditioning device 1 has a high temperature system 4 and a low temperature system 5. The vehicle air conditioning device 1 may include a high temperature system 4 and/or a low temperature system 5. The high temperature system 4 and the low temperature system 5 are secondary lines utilizing water or antifreeze liquid having a larger thermal capacity than the refrigerant of the refrigeration cycle 3 as a secondary medium. The high-temperature system 4 and the low-temperature system 5 indirectly perform heat exchange between the refrigerant of the refrigeration cycle 3 and the air to be subjected to heat exchange. The high temperature system 4 and the low temperature system 5 provide a thermal buffer by storing low temperature energy and/or high temperature energy obtained by the refrigeration cycle 3.

The high-temperature system 4 has a flow path 21 for a secondary medium. The high temperature system 4 has a pump 22 for sending the secondary medium. The pump 22 may be provided by an electric pump. The high temperature system 4 has a heat exchanger 23 that exchanges heat with the high temperature heat exchanger 12 of the refrigeration cycle 3. The high-temperature heat exchanger 12 and the heat exchanger 23 provide heat exchange between the refrigerant and the secondary medium. The high temperature system 4 has a heat exchanger 24. The heat exchanger 24 corresponds to the heating heat exchanger of the vehicle heat exchanger 1, that is, a heater.

The low temperature system 5 has a flow path 31 for a secondary medium. The low temperature system 5 has a pump 32 for sending the secondary medium. The pump 22 may be provided by an electric pump. The low temperature system 5 has a heat exchanger 33 that exchanges heat with the low temperature heat exchanger 13 of the refrigeration cycle 3. The low-temperature heat exchanger 13 and the heat exchanger 33 provide heat exchange between the refrigerant and the secondary medium. The low temperature system 5 has a heat exchanger 34. The heat exchanger 34 corresponds to the cooling heat exchanger of the vehicle heat exchanger 1.

The high temperature system 4 and the low temperature system 5 provide a system. The system is a medium different from both the refrigerant of the refrigeration cycle 3 and the air in the passenger compartment and functions as a buffer by storing high temperature energy and/or low temperature energy provided by the refrigeration cycle 3. When the compressor 11 is temporarily stopped, only the high temperature system 4 and the low temperature system 5 supply high temperature energy and/or low temperature energy for adjusting the room temperature. The temperature control capacity provided by only the high temperature system 4 and the low temperature system 5 suppresses the change of the state of the refrigeration cycle 3 during the period when the compressor 11 is temporarily stopped.

The vehicle air conditioning device 1 includes a control device (A/C ECU) 41. The control device 41 controls at least the electric expansion valves 14 and 15. The control device 41 performs feedback control on the opening degree of the electric expansion valves 14 and 15 to a plurality of stages including a completely closed state. The control device 41 inputs signals indicating an ON state (ON state) where the compressor 11 is driven by the engine 2 and an OFF state (OFF state) where the compressor 11 is not driven by the engine 2.

The control device 41 may control the compressor 11. When the compressor 11 is a variable capacity compressor, the control device 41 may adjust the capacity of the compressor 11. When the compressor 11 is provided with an electromagnetic clutch which is driven to be turned on/off, the control device 41 may control the electromagnetic clutch.

The vehicle has a control device (E/G ECU) 42. The control device 42 is also called an engine control device. The control device 42 temporarily stops the engine 2 while the engine 2 is in the operating state. When the engine 2 is temporarily stopped, the compressor 11 is not driven. Therefore, the refrigeration cycle 3 is temporarily stopped. When the refrigeration cycle 3 is temporarily stopped, high temperature energy and/or low temperature energy is not supplied. The high temperature system 4 and/or the low temperature system 5 continue to supply high temperature energy and/or low temperature energy by providing a thermal buffer.

The control device 42 stops the engine 2 with a temporary stoppage at an intersection or the like and/or with a stable inertial running state. The temporary stop of the engine 2 due to the temporary stoppage at an intersection or the like is called an idle stop. The temporary stop of the engine 2 accompanying a stable state of inertia running is called a coasting stop. The control device 42 automatically restarts the engine 2 when a predetermined time has elapsed. The control device 42 can use various methods to perform a temporary stop of the engine 2. The control device 42 supplies a signal indicating the stop period of the engine 2 to the control device 41.

These control devices 41 and 42 are electronic control units (Electronic Control Units). The control device has at least one arithmetic processing unit (CPU) and at least one memory device (MMR) as storage medium for storing programs and data.

The control device is provided by a microcomputer including a computer readable storage medium. The storage medium is a non-transitional tangible storage medium that temporarily stores a computer-readable program. The storage medium may be provided by a semiconductor memory, a magnetic disk, or the like. The control device may be provided by a set of computer resources linked by a computer or data communication device. The program is executed by a control device so that the control device functions as a device described in this specification and causes the control device to perform the method described in this specification.

The control system has, as an input device, a plurality of signal sources for supplying signals indicative of information input to the control device. In the control system, the control device acquires the information by storing the information in the memory device. The control system has a plurality of controlled objects whose behavior is controlled by the control device as an output device. The control system converts the information stored in the memory device into a signal and supplies the signal to the controlled object, thereby controlling the behavior of the controlled object.

Figure 2:
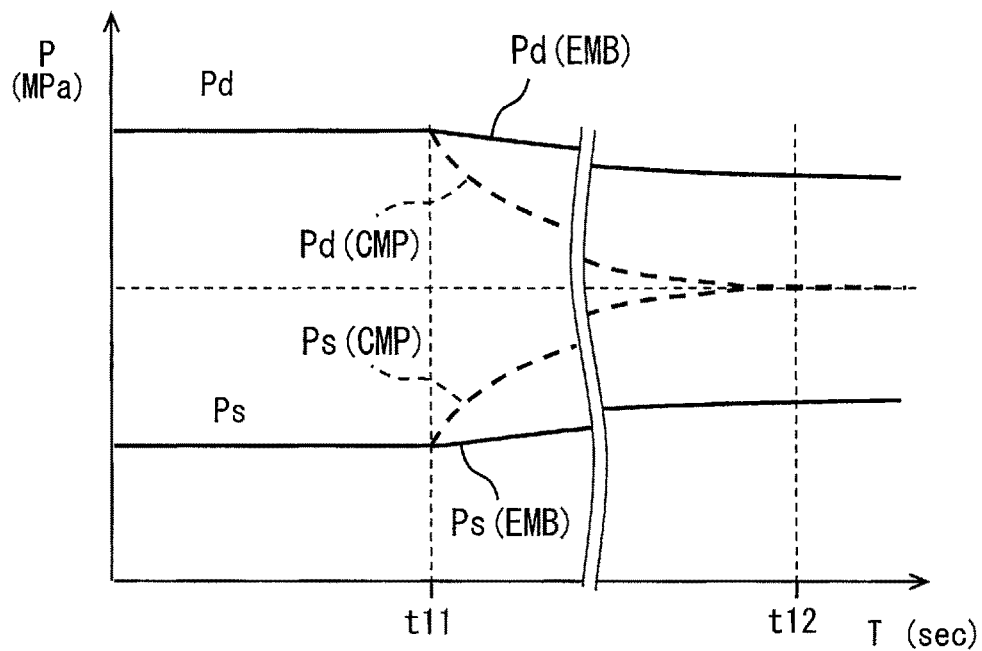
FIG. 2 is a waveform diagram for explaining an electric expansion valve.

FIG. 2 shows the discharge pressure Pd and the suction pressure Ps. The solid lines Pd (EMB) and Ps (EMB) show this embodiment. The broken lines Pd (CMP) and Ps (CMP) show comparative examples. In the drawing, the case where the compressor 11 is stopped at time t11 is shown.

In the case of the broken lines Pd (CMP) and Ps (CMP), when the compressor 11 is stopped, the refrigeration cycle 3 reaches an equalized state at time t12. In the pressure equalization state, the high pressure and the low pressure have equal pressure. When the compressor 11 is stopped, the electric expansion valves 14 and 15 are closed to maintain the low pressure at a low pressure. However, due to a leak through the compressor 11 and a leak through the electric expansion valves 14 and 15, it reaches the equalization state.

In the case of the solid lines Pd (EMB) and Ps (EMB), the electric expansion valves 14 and 15 are closed at time t11. When the electric expansion valves 14 and 15 are closed, as shown in the drawing, the pressure difference between the discharge pressure Pd and the suction pressure Ps can be maintained. In other words, the electric expansion valves 14 and 15 are valves capable of realizing a fully closed valve state capable of maintaining a high and low pressure difference.

Figure 3:
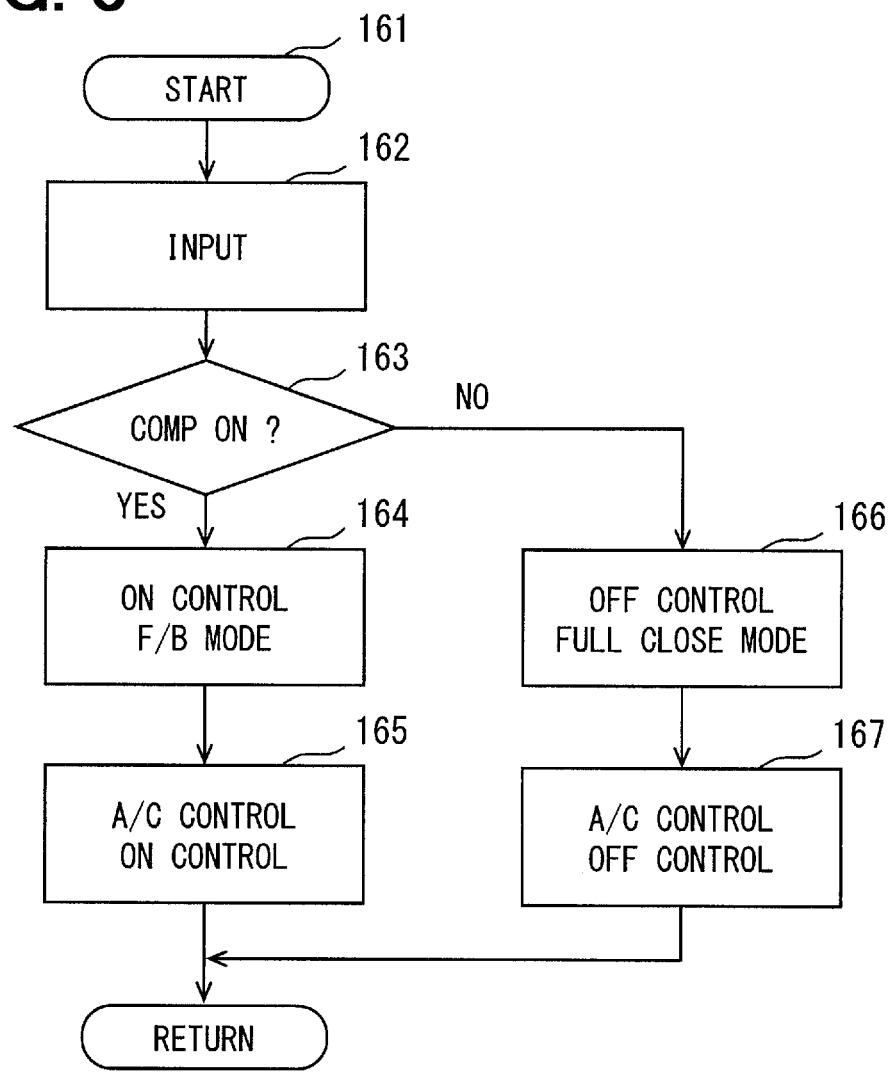
FIG. 3 is a flowchart showing control of a vehicle air conditioning device.

FIG. 3 is a flowchart showing control of a vehicle air conditioning device. The control device 41 performs basic control 161. In step 162, the control device 41 inputs signals. In step 163, the control device 41 determines whether or not the refrigeration cycle 3 is operated, that is, whether or not the compressor 11 is ON. When the compressor 11 is turned on, the process branches to step 164. In steps 164 and 165, the control device 41 executes air conditioning control when the refrigeration cycle 3 is operated. When the compressor 11 is turned OFF, the process branches to step 166. In steps 166 and 167, the control device 41 executes air conditioning control when the refrigeration cycle 3 is not operated.

In step 164, the control device 41 newly creates high temperature energy and/or low temperature energy as the heat energy source and the cold energy source of the vehicle air conditioning device 1 by the refrigeration cycle 3. The air conditioning control provided in step 164 includes feedback (F/B) control of the electric expansion valves 14 and 15. For example, the control device 41 controls the electric expansion valves 14 and 15 so that the refrigeration cycle 3 operates at the highest efficiency, that is, the observed superheat reaches the target superheat.

In step 165, the control device 41 executes air conditioning control. In step 165, the control device 41 controls a plurality of control elements of the vehicle air conditioning device 1 so that the indoor temperature is maintained at a target temperature so that at least the indoor temperature reaches the target temperature. In step 165, the control device 41 controls the pumps 22 and 32, for example, so that a predetermined high temperature is obtained in the heat exchanger 24 and a predetermined low temperature is obtained in the heat exchanger 34. In step 165, the control device 41 controls, for example, air-based equipment so as to obtain a predetermined air conditioning effect.

In step 166, the high temperature energy and/or the low temperature energy as the heat energy source and the cold energy source of the vehicle air conditioning device 1 is not newly created by the refrigeration cycle 3. The control provided at step 166 includes a fully closed control of the electric expansion valves 14 and 15, i.e., a FULL CLOSE MODE control.

In step 167, the control device 41 controls a plurality of control elements of the vehicle air conditioning device 1 so that the indoor temperature is maintained at a target temperature so that at least the indoor temperature reaches the target temperature. When passing through step 166, the refrigeration cycle 3 is stopped. In step 167, a heat storage state to the high temperature system 4 and/or the low temperature system 5 is determined. In step 167, the vehicle air conditioning device 1 controls the control elements by using only the heat storage state and/or a cold storage state, so that at least the indoor temperature reaches the target temperature, and so that the indoor temperature is maintained at the target temperature. In step 167, the control device 41 controls the pumps 22 and 32 so that high temperature energy and/or low temperature energy is obtained in the heat exchangers 24 and 34 utilizing only the heat storage state and/or only the cold storage state. In step 165, the control device 41 controls, for example, air-based equipment so as to obtain a predetermined air conditioning effect.

Figure 4:
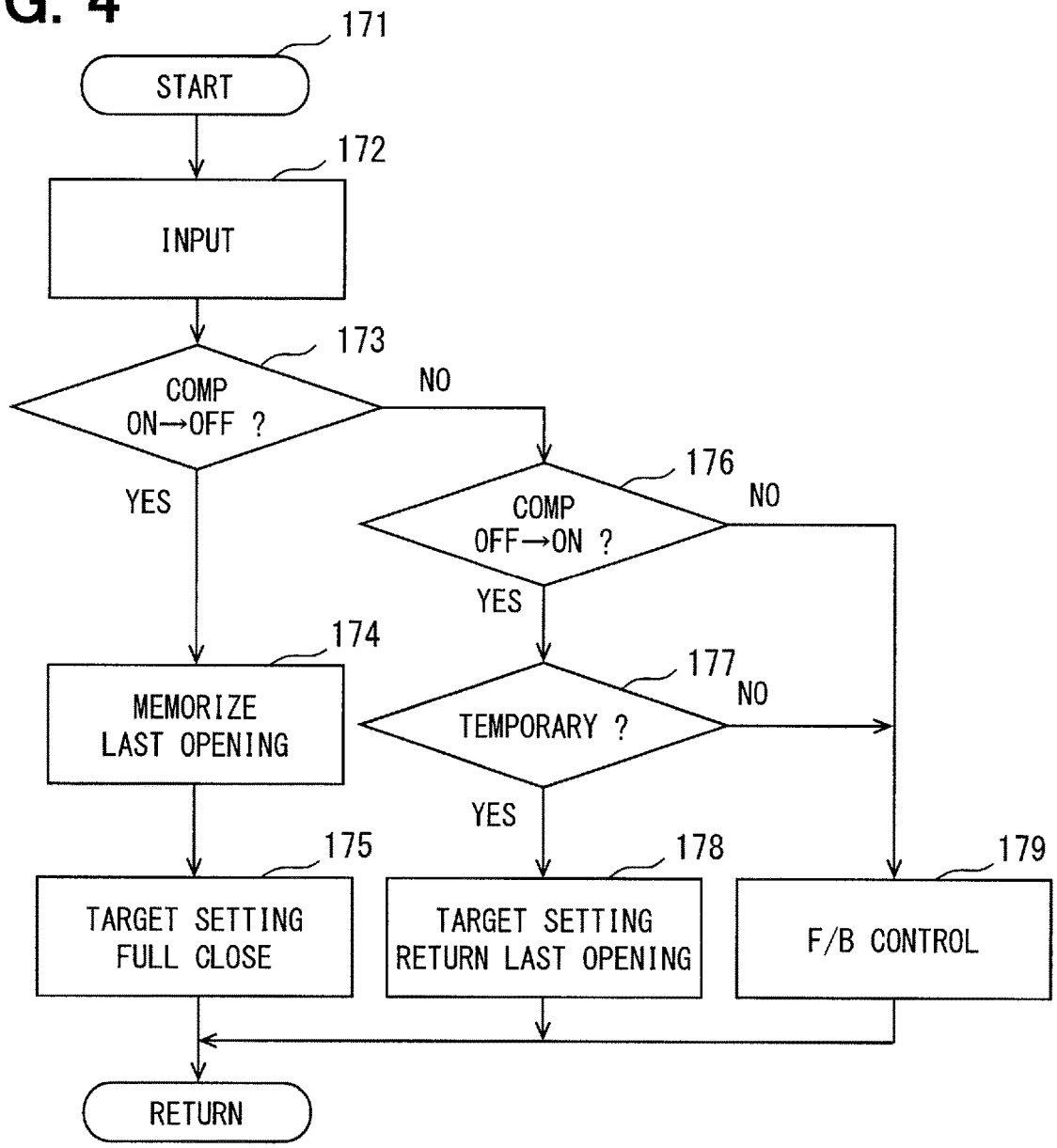
FIG. 4 is a flowchart showing control of an electric expansion valve.

FIG. 4 shows a flowchart for controlling the opening degrees of the electric expansion valves 14 and 15. The control device 41 performs opening degree control 171 for the electric expansion valves 14 and 15. The opening degrees of the electric expansion valves 14 and 15 are feedback-controlled so that the superheat (SH) or supercool (SC), which is the object of control, becomes the target value. The opening degrees of the electric expansion valves 14 and 15 are stably controlled to the minimum opening degree, i.e., fully closed, while the compressor 11 is stopped. Furthermore, when the compressor 11 is restarted, it is stably controlled to the immediately preceding opening degree at the time of stoppage. The immediately preceding opening degree is also taken as the initial value of the feedback control.

In step 172, the control device 41 inputs signals. For example, the control device 41 detects a signal indicating ON or OFF of the compressor 11. In step 173, the control device 41 determines whether or not the compressor 11 has been switched from the ON state to the OFF state. When the compressor 11 is switched from the ON state to the OFF state, the process proceeds to step 174. Otherwise, the process proceeds to step 176.

In step 174, the control device 41 stores the opening degrees of the electric expansion valves 14 and 15 immediately before. The opening degrees of the electric expansion valves 14 and 15 immediately before are stored as the immediately preceding opening degrees, respectively. The control device 41 stores the immediately preceding opening degree at least while the compressor 11 is in the OFF state.

In step 175, the control device 41 fully closes the target opening degree of the electric expansion valves 14 and 15. As a result, the opening degrees of the electric expansion valves 14 and 15 are fully closed. Step 175 provides a fully-closed drive module which drives the electric expansion valves 14 and 15 to the fully closed state when the compressor 11 is temporarily stopped.

In step 176, the control device 41 determines whether or not the compressor 11 is switched from the OFF state to the ON state. The "switching from the OFF state to the ON state" includes a case where the compressor 11 is switched from the OFF state to the ON state for air conditioning control. This "switching from the OFF state to the ON state" includes a case where the compressor 11 is switched from the OFF state to the ON state in response to a request from the control device 42, i.e., a case of switching accompanied with returning from the temporary OFF state. In step 176, if "switching from the OFF state to the ON state" is determined, the process proceeds to step 177. If the determination at step 173 and step 176 is negative, the process proceeds to step 179. That is, as long as the compressor 11 is in the ON state, the routine proceeds to step 179.

In step 177, the control device 41 determines whether or not the compressor 11 has recovered from the temporary OFF state. This determination can be performed by determining whether the temporary OFF state of the engine 2 by the control device 42 has been realized. If it is a temporary return from the OFF state, the process proceeds to step 178. If it is not a temporary return from the OFF state, that is, when the compressor 11 is continuously turned ON based on the air conditioning request, the process proceeds to step 179.

In step 178, the control device 41 returns the target opening degree of the electric expansion valves 14 and 15 to the immediately preceding opening degree. As a result, the opening degrees of the electric expansion valves 14 and 15 are returned to the immediately preceding opening degrees, respectively. This state is maintained for a predetermined time. For example, the target opening degree is maintained at the immediately preceding opening during one cycle of the control cycle. The immediately preceding opening degree contributes to suppress the calculation load required for controlling the electric expansion valves 14 and 15 and quickly return the electric expansion valves 14 and 15.

In step 179, the control device 41 sets the target opening degree of the electric expansion valves 14 and 15 to the opening degree provided by the feedback control. Therefore, after step 178 is executed, there is a case where the process proceeds to step 179. In this case, step 178 gives the initial value of the feedback control given in step 179.

Figure 5:
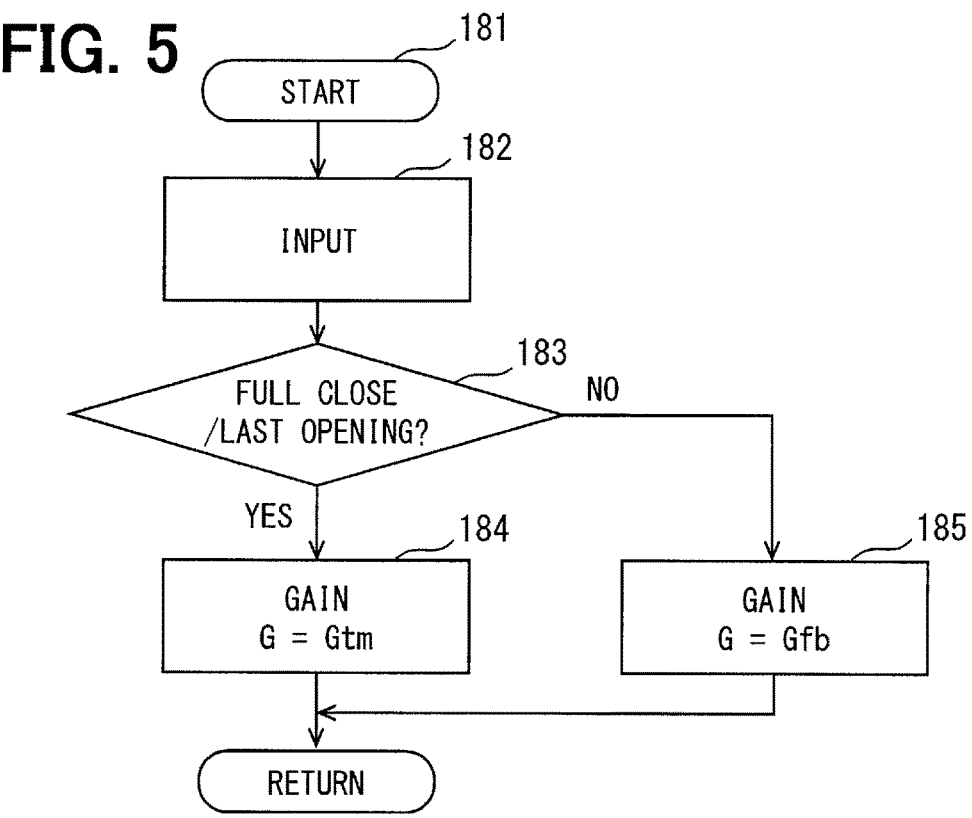
FIG. 5 is a flowchart showing control of an electric expansion valve.

Step 174 provides a storage module which stores the immediately preceding opening degree of the electric expansion valves 14 and 15 immediately before the compressor 11 is temporarily stopped. The storage module is provided in cooperation with the storage device of the control device 41. Step 178 provides the immediately preceding driving module which drives the electric expansion valves 14 and 15 to the immediately preceding openings when the compressor 11 is restarted. Step 177 provides an identification module which identifies whether or not it has been stopped temporarily, and permitting driving by the immediately preceding driving module only when the compressor is activated again after being temporarily stopped. By providing the step 177, a control distinct from a case where the compressor 11 is activated immediately after the refrigeration cycle 3 is normally used is provided. FIG. 5 shows a flowchart for controlling the opening degrees of the electric expansion valves 14 and 15. The electric expansion valves 14 and 15 may be realized by known actuators and known valve mechanisms. The electric expansion valves 14 and 15 may take the configuration disclosed in JP2015-14306A. In this case, JP2015-14306A is incorporated by reference.

The control device 41 executes processing 181 for gain setting. In step 182, the control device 41 inputs signals. For example, the control device 41 detects signals indicating the target opening degrees of the electric expansion valves 14 and 15. In step 183, the control device 41 determines whether or not the target opening degree of the electric expansion valves 14 and 15 is the fully closed opening degree or the immediately preceding opening degree. When the target opening degree indicates the fully closed state or when the target opening degree indicates the immediately preceding opening degree, the process proceeds to step 184. Otherwise, the process proceeds to step 186.

In step 184, the control device 41 sets the gain Gtm so that the target opening degrees of the electric expansion valves 14 and 15 are realized quickly. The gain Gtm corresponds to the highest speed at which the electric expansion valves 14 and 15 can perform. For example, when a step motor is used as the actuator, the upper limit of the step change obtained by one change, for example, the step/sec is set to the maximum value.

In step 185, the control device 41 sets the gain Gfb so that the target opening degrees of the electric expansion valves 14 and 15 are realized. The gain Gfb corresponds to responsiveness that the electric expansion valves 14 and 15 can stably perform.

The gain Gtm is set to be equal to or larger than the gain Gfb. Step 185 provides a feedback control module that performs feedback control of the opening degrees of the electric expansion valves 14 and 15. The feedback control module is set so as to realize the stable behavior of the electric expansion valves 14 and 15. For example, the feedback control module can be realized by PID control with superheat or supercool as a control target. Step 184 provides a response acceleration module which accelerates a response to drive the electric expansion valves 14 and 15 to the fully closed state more quickly than the feedback control module. Step 184 provides a response acceleration module which accelerates a response to drive the electric expansion valves 14 and 15 to the immediately preceding opening degree more quickly than the feedback control module. The response acceleration module adjusts a gain for controlling the opening degrees of the electric expansion valves 14 and 15.

Figure 6:
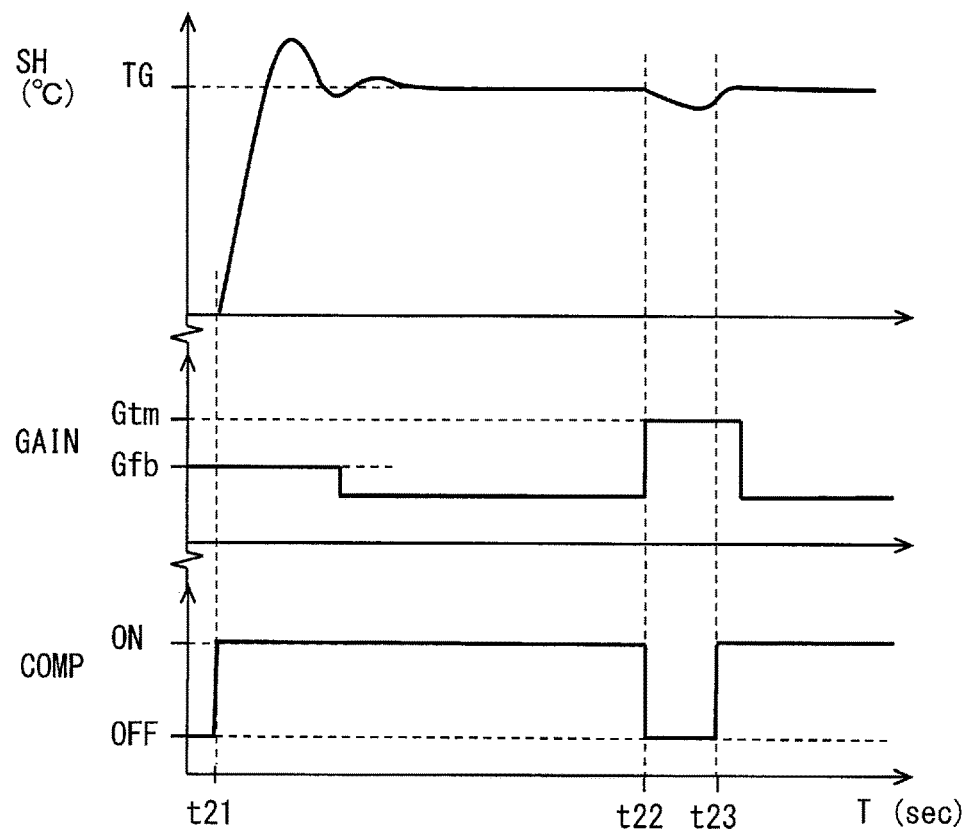
FIG. 6 is a waveform diagram showing a behavior of the electric expansion valve.

FIG. 6 is a waveform diagram showing an example of the behavior of ON/OFF of the compressor 11, the control gain of the electric expansion valves 14 and 15, and the superheat (SH) to be controlled. The vertical axis shows ON/OFF of the compressor 11 (COMP), the control gain GAIN of the electric expansion valves 14 and 15, and the superheat SH. The horizontal axis represents the time course T (sec). At time t21, the compressor 11 is controlled from the OFF state to the ON state for air conditioning control. At time t22, the compressor 11 is temporarily driven from the ON state to the OFF state. At time t23, the compressor 11 is automatically restored again from the OFF state to the ON state.

Immediately after time t21, the low pressure Ps decreases with the start of operation of the compressor 11, and the superheat rapidly rises. Immediately after the start of the control immediately after the time t21, the gain Gfb of the electric expansion valve 14 enables rapid response of the superheat to the target value TG. When the superheat SH reaches the target value TG, the gain Gfb may be automatically adjusted. The gain Gfb gives the stability that the superheat SH is maintained in the vicinity of the target value TG.

At time t22, the engine 2 is temporarily stopped by the control device 42. At the same time, the immediately preceding opening degree is stored. At the same time, the gain Gtm of the electric expansion valve 14 is given. At the same time, the target opening degree of the electric expansion valve 14 is fully closed. The gain Gtm makes it possible for the opening degree of the electric expansion valve 14 to quickly respond to the fully closed state as the target. As a result, the control device 42 temporarily stops the engine 2 and at the same time controls the electric expansion valve 14 to the fully closed state.

At time t23, the engine 2 is automatically started by the control device 42, and at the same time, the immediately preceding opening degree is set as the target value. At the same time, the gain Gtm of the electric expansion valve 14 is given. The gain Gtm makes it possible for the opening degree of the electric expansion valve 14 to quickly respond to the immediately preceding opening degree as the target. As a result, at the same time that the engine 2 is restarted by the control device 42, the electric expansion valve 14 is returned to the immediately preceding opening degree. When the feedback control eventually starts, the gain Gtm is returned to the gain Gfb.

The electric expansion valves 14 and 15 are placed in a fully closed state while the engine 2 is temporarily and automatically stopped. In addition, while the electric expansion valves 14 and 15 are feedback-controlled, they are reliably placed in the fully closed state by the control signal exceeding the feedback control. Therefore, the high and low pressure of the refrigeration cycle 3 is maintained in the immediately preceding operation state. When the engine 2 is automatically restarted, the electric expansion valves 14 and 15 are returned to the immediately preceding operating state. In addition, while the electric expansion valves 14 and 15 are feedback-controlled, they are reliably placed in to the immediately preceding opening degree by the control signal exceeding the feedback control. Therefore, the high and low pressure of the refrigeration cycle 3 is controlled again from the immediately preceding operation state. In addition, since the immediately preceding opening degree gives the initial value of the feedback control, the feedback control is restarted in a stable manner.

Second Embodiment

In the preceding embodiments, when the compressor 11 is switched from the OFF state to the ON state by restarting the engine 2, the immediately preceding opening degree is simultaneously applied to the electric expansion valves 14 and 15. In addition to this, shock absorbing control for the compressor 11 may be added.

Figure 7:
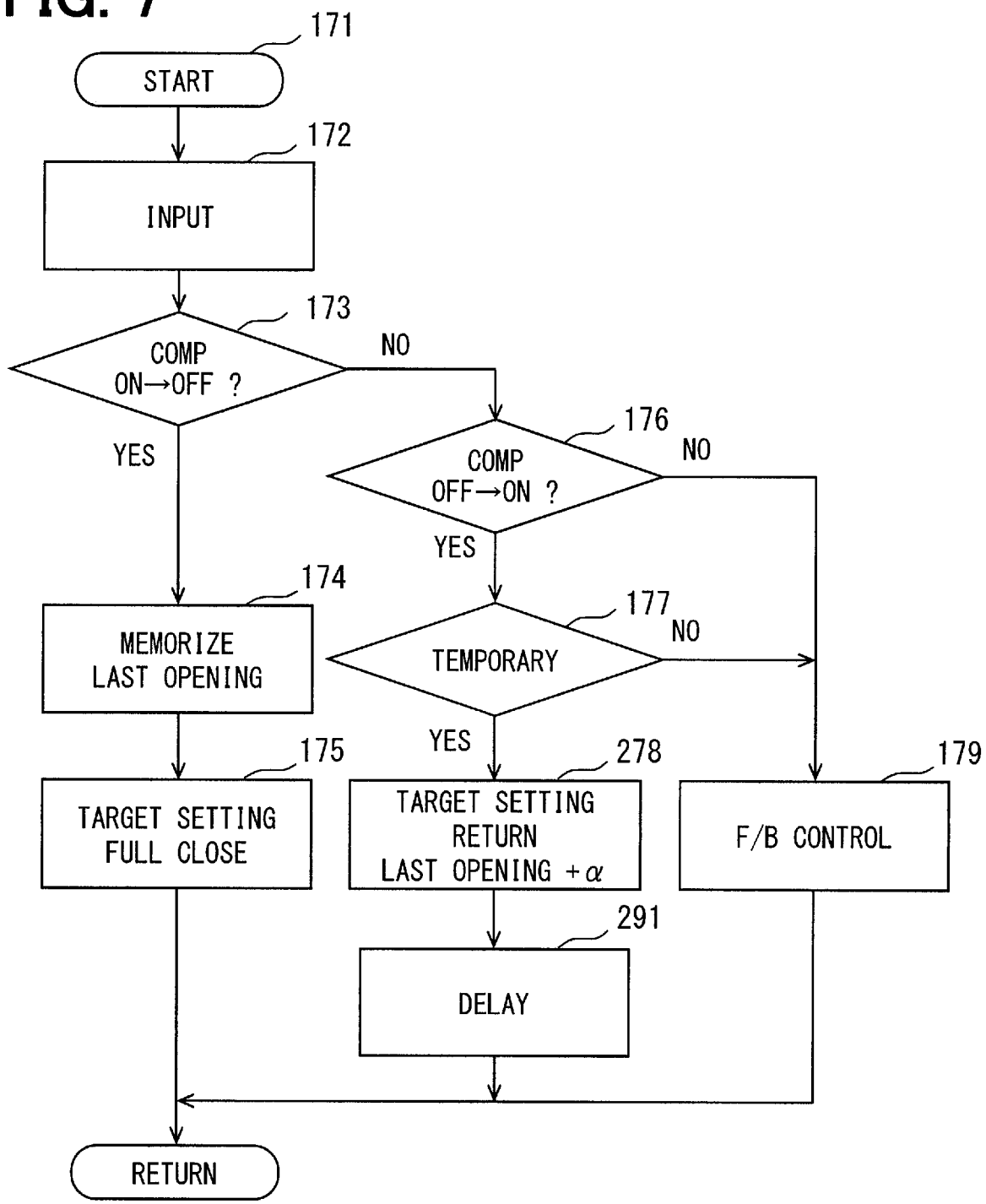
FIG. 7 is a flowchart showing control of the electric expansion valve according to a second embodiment.

For example, the flowchart shown in FIG. 7 is used. Instead of step 178, step 278 is used. Step 278 gives an opening degree larger than the immediately preceding opening degree, that is, the immediately preceding opening degree+α. Step 278 provides a block module which prevents the electrical expansion valves 14 and 15 from being fully closed when the compressor 11 is restarted. The larger opening degree provided by step 278 prevents the high pressure from rising excessively when the compressor 11 is restarted. In order to weaken an impact when the compressor 11 is restarted, the opening degree smaller than the immediately preceding opening degree may be used.

Also, after step 278, the processing of step 291 may be added. Step 291 continues to apply a relatively large opening degree for the delay time. The delay time provided by this step 291 prevents the high pressure from rising excessively when the compressor 11 is restarted. For example, when restarting the compressor, an excessive rise in high pressure is prevented to the extent that the impact of the compressor is relieved.

Third Embodiment

In the preceding embodiments, the immediately preceding opening degrees of the electric expansion valves 14 and 15 are stored when the compressor 11 is temporarily stopped. Alternatively or additionally, a signal processing module may be provided so as to store the opening degree suitable for resuming operation of the compressor 11 as the immediately preceding opening degree. In this case, for example, the signal processing module determines the stability of the behavior of the refrigeration cycle 3. The storage module stores the opening degree when the behavior of the refrigeration cycle 3 is stable as the immediately preceding opening degree.

Figure 8:
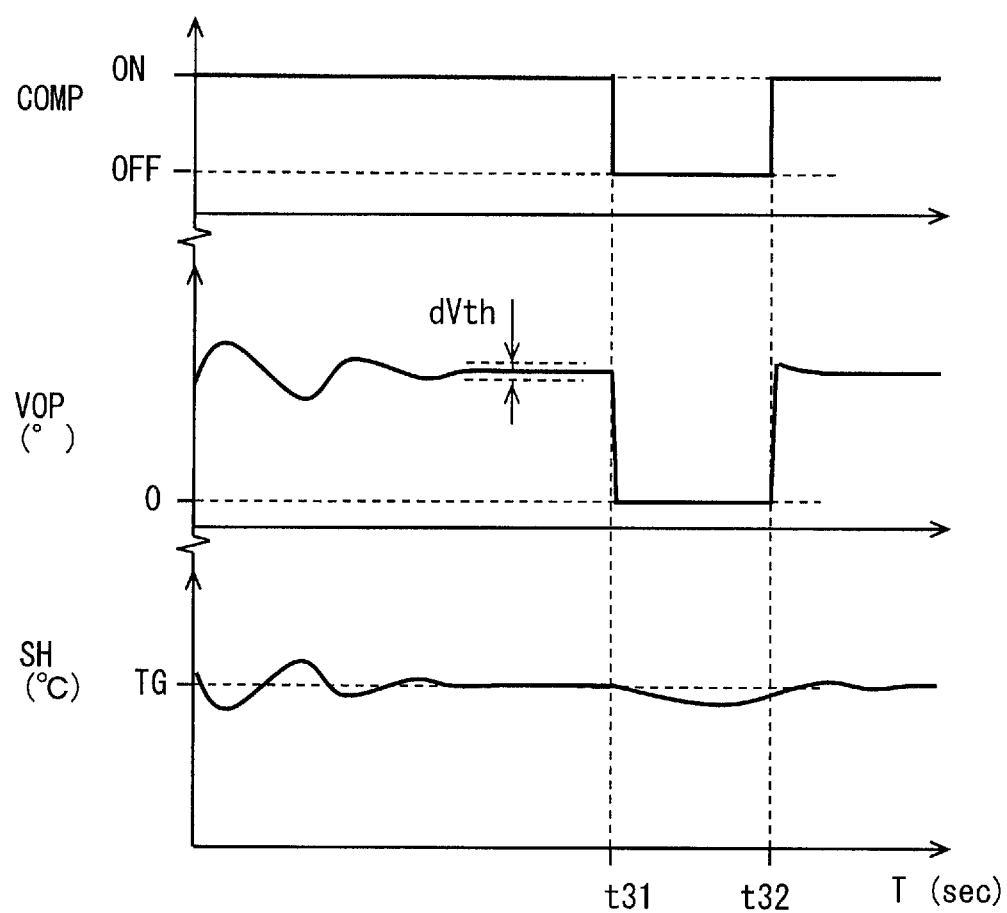
FIG. 8 is a waveform diagram showing a behavior of the electric expansion valve according to a third embodiment.

In FIG. 8, the vertical axis represents ON/OFF of the compressor 11 (COMP), the opening degree (VOP) of the electric expansion valves 14 and 15, and the degree of superheat in the evaporator, that is, superheat (SH). The horizontal axis represents the time course T (sec). The compressor 11 is temporarily stopped at time t31 and the compressor 11 is restarted from the temporary stop at time t32.

In this embodiment, the flowchart of FIG. 4 or FIG. 7 can be used. In step 174, the stability of the behavior of the refrigeration cycle 3 is determined. The stability of the behavior of the refrigeration cycle 3 is determined by the stability of the opening degree of the electric expansion valves 14 and 15. In step 174, for example, it is determined that the variation of the opening degree is within the predetermined threshold value dVth. When the variation of the opening degree is within the predetermined threshold value dVth, it is determined that the behavior of the refrigeration cycle 3 is stable. Further, in step 174, the opening degree when the behavior of the refrigeration cycle 3 is stable is stored as the immediately preceding opening degree. Step 174 provides a storage module and provides a signal processing module.

According to this embodiment, the opening degree during the period in which the behavior of the refrigeration cycle 3 is stable is stored as the immediately preceding opening degree. Therefore, it is possible to reproduce a state in which the behavior of the refrigeration cycle 3 is stable after the operation of the compressor 11 is restarted.

Other Embodiments

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. The disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the preceding embodiments, both the high-temperature system 4 and the low-temperature system 5 are provided. Alternatively, only the high temperature system 4 or the low temperature system 5 may be provided. For example, it may be possible to provide only the low temperature system 5 to suppress deterioration of cooling sensation.

In the preceding embodiments, the opening degree in a period during which the behavior of the refrigeration cycle 3 is stable is stored as the immediately preceding opening degree as the opening degree suitable for restarting the operation of the compressor 11. Alternatively or additionally, the storage module may calculate a value stored as the immediately preceding opening degree based on a plurality of sample values of the opening degree in a period during which the behavior of the refrigeration cycle is stable. For example, an average value, a median value, a smoothed value (weighted average value), or the like of a plurality of sample values may be calculated and stored as the immediately preceding opening degree.

In the preceding embodiments, the gain Gtm and the gain Gfb are switched so that the fully closed state and the immediately preceding opening degree are realized. Alternatively, the signals for controlling the electric expansion valves 14 and 15 may be set to a predetermined values. For example, the signals may be signals for driving the electric expansion valves 14 and 15 to the fully closed state. Further, the signal may be signals for controlling the electric expansion valves 14 and 15 to the immediately preceding opening degree.

In the preceding embodiments, when the engine 2 is restarted and the compressor 11 is restarted, the electric expansion valves 14 and 15 are controlled to the predetermined opening degree from the fully closed state. Alternatively, before the compressor 11 is started, the electric expansion valves 14 and 15 may be controlled from the fully closed state to a predetermined opening degree. Thereby preventing an excessive rise in the high pressure caused by the fully closed state of the electric expansion valves 14 and 15.

In the preceding embodiment, as the electric expansion valves 14 and 15, the electric expansion valves 14 and 15 for opening and closing a single flow path are exemplified. Alternatively, a plurality of adjustable flow paths may be provided. For example, an openable and closable flow path and an adjustable flow path can be used together. Such an electric expansion valve makes it possible to expand the range in which the flow rate can be adjusted. In the preceding embodiments, the control of the electric expansion valves 14 and 15 are described in detail. In addition to this, the blower of the vehicle air conditioning device 1 may be controlled to perform cooperative work. For example, at the same time that the compressor 11 is switched from the ON state to the OFF state, an air blowing amount of the blower may be decreased. Further, at the same time when the compressor 11 is switched from the OFF state to the ON state, the air blowing amount of the blower may be increased to the air blowing amount corresponding to the air conditioning load. Such cooperative work may improve comfort. In addition, such cooperative work ensures more reliable and extends time longer a maintenance of the pressure difference between the high pressure and the low pressure.

In the preceding embodiment, the electric expansion valves 14 and 15 capable of being fully closed are used. Alternatively, various electric expansion valves 14 and 15 can be used. For example, the electric expansion valves 14 and 15 may have a valve mechanism for performing only opening and closing.

In the preceding embodiments, the engine 2 is used as a power source, and the compressor 11 driven by the engine 2 is used. Alternatively, the power source may be an electric motor or a battery mounted on the vehicle. In this case, the compressor 11 is an electric compressor and is driven by a battery or a high-voltage battery for vehicle. Even in this case, the electric motor is not requested for air conditioning, but may be stopped by an external request other than air conditioning such as idle stop or noise reduction. In the case where the electric motor is forcibly stopped in place of the engine 2, this embodiment maintains the high pressure and the low pressure, so that restarting is easy.

In the preceding embodiments, it is determined in step 177 whether or not the stop is a temporary stop. As an example, the compressor 11 may be temporarily stopped by temporarily stopping the engine 2 as a power source. As an example, there is a case where the compressor 11 is temporarily stopped by providing an electromagnetic clutch in a power transmission system for performing cooperative work between the engine 2 and the compressor 11, and by controlling the electromagnetic clutch from the connected state to the disconnected state.

The determination whether it is temporary or not at step 177 is used to determine a preset short time off-state. Also, the determination whether it is temporary or not is also a determination whether or not the immediately preceding opening degree can be used when the compressor 11 is activated again. It can be said that it is also a determination whether or not it is a forcible stop caused by the circumstances of the power source. In a typical example, in a determination whether it is temporary or not, it may be determined that the stop due to the air conditioning state is a failure even if it is for a short time. The term temporary stoppage should be taken to encompass the multiple examples mentioned in this specification.

Even when the power source is temporarily stopped, air conditioning can be maintained by a thermal buffer that can storage heat energy or cold energy. It is desirable that the period called temporary is the same as the period during which auxiliary air conditioning by as heat storage means or a cold storage means is possible or is shorter than the period during which auxiliary air conditioning by the heat storage means or the cold storage means is possible. For example, a cold storage evaporator, a water circuit for cooling or heating can be provided as the heat storage means or the cold storage means. For example, in a case of performing the cold storage type cooling operation, the power source can be stopped during a period in which the cold storage means can perform cooling. Further, in the case of performing the heat storage type heating operation, the power source can be stopped during a period in which the heat storage means can perform heating.

In some cases, the power source supplies the running power of the vehicle and the driving force of the compressor 11. In this case, the temporary period is a stop period for satisfying a necessary amount as the running power. For example, there is a case where the compressor 11 is driven by a drive force of a running engine.

As an example, in order to obtain the power for acceleration of the vehicle, the power supply to the compressor 11 is temporarily stopped (cut off). In other words, since a necessary running output is large and no margin for driving the compressor 11 can be obtained, the power supply to the compressor 11 is stopped. In this case, it can be said that the determination whether or not it is a temporary stop is a determination whether or not it is a stop for power supply other than the air-conditioning use. In this case, the engine and the compressor 11 are connected by, for example, a belt type power transmission system, and the power transmission system is provided with an electromagnetic clutch. The temporary stop is executed by controlling the electromagnetic clutch from the engaged state to the disengaged state.

As another example, the engine 2 may be stopped by engine control for suppressing fuel consumption including idle stop control. In this case, since the engine 2 is stopped during stable running in order to suppress fuel consumption, the compressor 11 is stopped. As another example, a vehicle type in which an engine control method called coasting is adopted is known. In this case, since the engine 2 is stopped during stable running in order to suppress fuel consumption, the compressor 11 is stopped. In these cases, it can be said that the determination whether or not it is a temporary stop is a determination whether or not it is a stop for suppressing fuel consumption. It should be understood that these examples can be included in the term temporary stop.

An electric motor that generates power by electric power may be adopted as the power source. The electric motor may supply the running power of the vehicle and/or the power of the compressor 11. In a typical example, the compressor 11 may be driven by the electric motor. For example, a vehicle type called a hybrid vehicle, a plug-in hybrid vehicle, or an electric vehicle is known. Even in these vehicles, the power of the compressor 11 may be temporarily stopped due to circumstances of the power source.

As an example, the residual electric energy of the battery may decrease. In this case, the power of the compressor 11 is temporarily stopped in order to temporarily lower a usage amount of the battery power. When the vehicle has a generator, the battery is charged. As another example, a temperature of a battery may become undesirably high in order to maintain the performance of the battery. In this case, in order to protect and cool the battery, the use of the battery power for driving the compressor 11 is temporarily stopped.

When the power source is provided by the engine or the electric motor, the rotational speed of the compressor 11 may be controlled depending on an air conditioning load. When the air conditioning load is low, the rotational speed of the compressor 11 may be controlled to be low. In this case, the rotational speed of the compressor 11 sometimes falls to the lowest rotational speed. However, in order to secure the circulation amount of the lubricating oil in the refrigeration cycle 3, it is desirable that the rotation speed of the compressor 11 is higher than the minimum rotation speed. Therefore, the compressor 11 may be operated intermittently in some cases. In this case, the power of the compressor 11 intermittently repeats the temporary operation and the temporary stop. In this example as well, it can be said that the power source is temporarily stopped without depending on an air conditioning state. In this case, it can be said that the determination whether or not it is a temporary stop is a determination whether or not it is a stop for providing the minimum air conditioning capability.

U.S. Pat. Nos. 5,277,038 and 6,807,820 disclose a technique for storing cold or hot energy in a secondary system medium without directly using a source of cold energy or a source of hot energy. However, a refrigeration cycle (including a case of being used as a heat pump) having a compressor may be temporarily stopped in a continuous operation period. When the refrigeration cycle is temporarily stopped, the refrigeration cycle rapidly loses temperature adjustment ability. U.S. Pat. No. 6,701,731 discloses a technique for providing temperature adjustment ability during the stop period when the refrigeration cycle is temporarily stopped. JP2015-14306A discloses an electric expansion valve that can be completely closed. In the configuration of the prior art, when the refrigeration cycle is temporarily stopped, the refrigeration cycle quickly loses its temperature control ability. Therefore, there is a problem that the interior of the passenger compartment cannot be kept comfortable. Also, in U.S. Pat. No. 6,701,731, a dedicated low-pressure system is required.

What is claimed is:
1. A vehicle air conditioning device comprising:
a refrigeration cycle having a compressor for a refrigerant, a high-temperature heat exchanger providing high temperature energy, an electric expansion valve being capable of fully closing a fully closed state, and a low-temperature heat exchanger providing low temperature energy, the refrigeration cycle being a vapor compression type refrigeration cycle, a power supply from a power source to the compressor being temporarily stopped;
a high temperature system provided as a thermal buffer for high temperature energy provided by the refrigeration cycle, the high temperature system including a first secondary medium different from both the refrigerant and air, a flow path for the first secondary medium, a pump for the first secondary medium in the flow path, a heat exchanger exchanging heat between the refrigerant in the high temperature heat exchanger and the first secondary medium in the heat exchanger, and a heat exchanger as a heating heat exchanger of the vehicle air conditioning device, the thermal buffer being provided between an air conditioning load and the refrigeration cycle;
a low temperature system provided as a thermal buffer for low temperature energy provided by the refrigeration cycle, the low temperature system including a second secondary medium different from both the refrigerant and air, a flow path for the second secondary medium, a pump for the second secondary medium in the flow path, a heat exchanger exchanging heat between the refrigerant in the low temperature heat exchanger and the second secondary medium in the heat exchanger, and a heat exchanger as a cooling heat exchanger of the vehicle air conditioning device, the thermal buffer being provided between the air conditioning load and the refrigeration cycle; and a control device having a processor and a tangible storage medium, the control device being configured to feedback-control the opening degree of the electric expansion valve, identify whether or not the compressor has been stopped temporarily, store an immediately preceding opening degree of the electric expansion valve immediately before the compressor is temporarily stopped, drive the electric expansion valve to a fully closed state when the compressor is temporarily stopped, drive the electric expansion valve to the immediately preceding opening degree only when the compressor is activated again after the compressor is temporarily stopped, and drive the electric expansion valve to an opening degree under the feedback-control when the compressor is activated after the compressor is not temporarily stopped.

2. The vehicle air conditioning device claimed in claim 1, wherein the control device is configured to accelerate a response to drive the electric expansion valve to the immediately preceding opening degree more quickly than the feedback: control.

3. The vehicle air conditioning device claimed in claim 1, wherein the control device is configured to accelerate a response to drive the electric expansion valve to the fully closed state more quickly than the feedback-control.

4. The vehicle air conditioning device claimed in claim 1, wherein the control device is configured to adjust a gain for controlling an opening degree of the electric expansion valve to accelerate the response to the electric expansion valve.

* * * * *